United States Patent
Poulin et al.

(10) Patent No.: US 8,923,169 B2
(45) Date of Patent: Dec. 30, 2014

(54) SYSTEMS AND METHODS OF OPERATIONAL MODES FOR A TRANSCEIVER

(71) Applicant: SiGe Semiconductor, Inc., Ottawa (CA)

(72) Inventors: Grant Darcy Poulin, Carp (CA); Peter Ledel Gammel, Wilmington, MA (US)

(73) Assignee: SiGe Semiconductor, Inc., Ottawa, ON (CA)

( * ) Notice: Subject to any disclaimer, the term of this patent is extended or adjusted under 35 U.S.C. 154(b) by 118 days.

(21) Appl. No.: 13/790,192

(22) Filed: Mar. 8, 2013

(65) Prior Publication Data
US 2013/0188529 A1    Jul. 25, 2013

Related U.S. Application Data

(60) Division of application No. 13/342,898, filed on Jan. 3, 2012, now Pat. No. 8,406,159, which is a continuation of application No. 12/367,073, filed on Feb. 6, 2009, now Pat. No. 8,089,906.

(51) Int. Cl.
| | |
|---|---|
| H04J 3/00 | (2006.01) |
| H04B 1/44 | (2006.01) |
| H04B 1/00 | (2006.01) |
| H04L 5/14 | (2006.01) |
| H04L 27/00 | (2006.01) |

(52) U.S. Cl.
CPC ............... *H04B 1/44* (2013.01); *H04B 1/006* (2013.01); *H04L 5/143* (2013.01); *H04L 5/1469* (2013.01); *H04L 27/0002* (2013.01); *H04L 27/0008* (2013.01)
USPC ............................................ 370/280; 455/73

(58) Field of Classification Search
CPC ...... H04B 1/006; H04B 1/44; H04L 27/0002; H04L 27/0008; H04L 5/143; H04L 5/1469
USPC ................. 370/276, 277, 280, 281, 294, 295; 455/78
See application file for complete search history.

(56) References Cited

U.S. PATENT DOCUMENTS

| | | | |
|---|---|---|---|
| 5,881,369 | A | 3/1999 | Dean et al. |
| 5,926,466 | A | 7/1999 | Ishida et al. |
| 6,535,748 | B1 | 3/2003 | Vuorio et al. |
| 7,376,093 | B2 | 5/2008 | Barabash et al. |
| 8,089,906 | B2 | 1/2012 | Poulin et al. |
| 2002/0072339 | A1 | 6/2002 | Hamalaninen |
| 2006/0240793 | A1 | 10/2006 | Andre et al. |

*Primary Examiner* — Gary Mui
(74) *Attorney, Agent, or Firm* — Knobbe, Martens, Olson & Bear, LLP

(57) ABSTRACT

A transceiver circuit is configured to operate in a first mode of operation and a second mode of operation such that a receive signal propagates from an antenna through a first filter to a low noise amplifier while simultaneously a transmit signal propagates from a power amplifier through a second filter to the antenna when operating in the first mode. The receive signal propagates from the antenna to the low noise amplifier without being filtered while alternating with the transmit signal propagating from the power amplifier to the antenna without being filtered when operating in the second mode.

20 Claims, 4 Drawing Sheets

SYSTEMS AND METHODS OF OPERATIONAL MODES FOR A TRANSCEIVER

INCORPORATION BY REFERENCE TO RELATED APPLICATIONS

Any and all priority claims identified in the Application Data Sheet, or any correction thereto, are hereby incorporated by reference under 37 CFR 1.57.

FIELD OF THE INVENTION

The invention relates generally to methods and systems for communication and more particularly to a circuit and method for supporting both time-division-duplex (TDD) and frequency division duplex (FDD) modes of operation in a same transceiver.

BACKGROUND

Radio transmission is used widely in various applications. In some applications, a signal is transmitted from a source to a destination for communication in that direction only. One common example is broadcast radio and broadcast television. When broadcast transmission is employed, a broadcaster can transmit a signal continuously for reception without receiving a return signal.

For bi-directional communication, each end of a communication path transmits and receives signals. Two common approaches to supporting bi-directional communication include time-division duplexing (TDD) and frequency-division duplexing (FDD). When a radio operates in TDD mode, it transmits (Tx) and receives (Rx) signals on the same frequency at different times. This is accomplished, for example, when the transmitted and received signals are within known timeslots by using a simple switch to switch between Tx mode of operation and Rx mode of operation for the appropriate timeslots. Advantageously, switches are easily implemented with limited loss and limited overall effect on switched signals.

An FDD radio, in contrast, transmits and receives at the same time but on different frequencies. These frequencies are often quite closely spaced. For example, cellular radio duplex spacing is only 60 MHz for a nominal 1.9 GHz radio. To avoid having the transmitter interfere with the receiver, FDD systems employ very sharp filters, so that any transmit energy that falls in the receive band is attenuated such that it does not interfere with the intended reception. These duplex filters have loss even in the pass-band but are necessary parts of the FDD system. The impact of the losses in transmission is, effectively, wasted RF energy that otherwise would have been provided to the antenna. The impact of the loss is expressed as a reduction in system power efficiency and, in the context of battery operated devices, a reduction in the usage time between battery charging cycles. On the reception side, filter losses mean that less signal energy is available for processing by the receiver and as a consequence the range of operation of the device in respect of distance is more limited.

While a same power amplifier (PA) could be used for either a TDD or FDD system, implementing a single system supporting both FDD and TDD and using a same PA is problematic. The extra duplexer losses incurred in implementing an FDD system—losses from the sharp filter, for example—unduly penalize a TDD system. Conversely, the switch used to toggle between Tx and Rx modes in a TDD system does not allow for FDD operation, since it will not provide the necessary duplex filtering.

In U.S. Pat. No. 5,881,369 in the name of Dean and Park and in U.S. Pat. No. 7,376,093 in the name of Barabash and Morris, dual mode, FDD-TDD, transceivers are disclosed. In order to achieve this, a plurality of additional switches are inserted within the circuit to support either FDD or TDD operation. For example, as shown in U.S. Pat. No. 7,376,093, an antenna is coupled to a first receive filter and first transmit filter in parallel one to another. Each filter is coupled to a first switch for coupling same to a receive and transmit path respectively for supporting FDD operation. When the first switches are closed, the receive signal and transmit signal are directed according to a conventional FDD transceiver. When the first switches are not both closed, closing them in an alternating sequence allows for a TDD transceiver. Of course, providing an additional switch to couple the two receive paths to allow all the received energy to reach the receiver is also shown in Barabash and Morris.

Unfortunately, as noted above, each of these configurations suffers losses associated with the filters in the receive path and the transmit path. Though overall, the configurations function, they provide reduced power efficiency and, in this regard, are often not cost effective dual mode solutions because of the operational cost imposed—reduced battery life, increased battery cost, etc.

It would be advantageous to overcome these and other limitations of the prior art.

SUMMARY OF THE INVENTION

In accordance with an embodiment of the invention there is provided a circuit comprising: a first port for coupling with an external signal source; a first receive coupling path comprising a receive filter disposed electrically between the external signal source and a receiver; a second receive coupling path other than comprising the receive filter disposed electrically between the external signal source and the receiver; a first transmit coupling path comprising a transmit filter disposed electrically between the external signal source and an amplifier; a second transmit coupling path other than comprising the transmit filter disposed electrically between the external signal source and the amplifier; and, a first switching circuit for in a first switch mode coupling the first port to the receiver via the first receive coupling path and the first port to the amplifier via the first transmit coupling path and for in a second other mode alternately coupling the first port to the receiver via the second receive coupling path and to the amplifier via the second transmit coupling path.

In accordance with another aspect of an embodiment of the invention there is provided a method comprising: receiving a signal at a first port of a receiver circuit; switchably selecting between a first receive coupling path comprising a filter and a second receive coupling path other than comprising a filter for propagation of the signal to a receiver; receiving a transmit signal; amplifying the transmit signal with an amplifier to provide an amplified signal; and, providing the amplified signal to the first port for transmission therefrom.

In accordance with yet another embodiment of the invention there is provided a circuit comprising: a first port for coupling with an external signal source; a first coupling path comprising a first filter between the external signal source and a receiver; a second coupling path other than comprising a filter between the external signal source and the receiver, the second coupling path parallel to the first coupling path; a third coupling path between the external signal source and an amplifier; a first switching circuit for in a first switch mode coupling the first port to the receiver via the first receive coupling path and the first port to the amplifier via the first transmit coupling path and for in a second other mode coupling the first port to the receiver via the second receive coupling path absent a filter disposed electrically between the first port and the receiver.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1A:
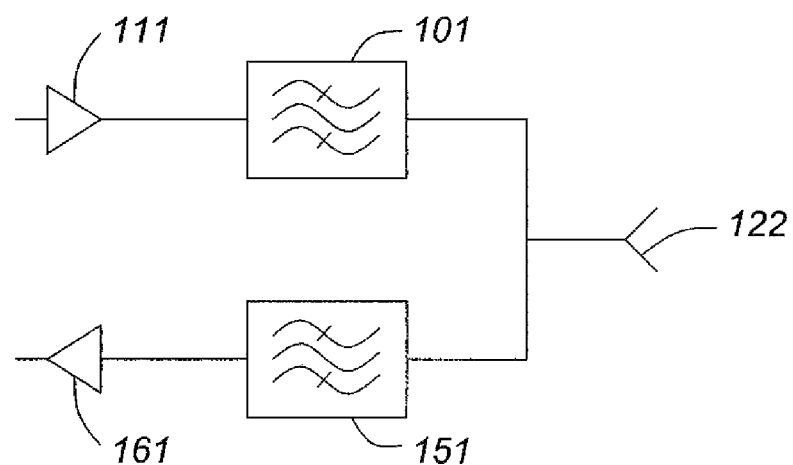
FIG. 1a is a simplified block diagram of a prior art FDD transceiver.

Referring to FIG. 1a, a prior art FDD circuit is shown. The antenna 122 is coupled to each of two filters 101 and 151. The filter 101 is then coupled to power amplifier 111 forming the transmit portion of the FDD circuit. The filter 151 is coupled to low noise amplifier 161 forming a receive portion of the FDD circuit. The filters 101 and 151 are designed for passing signals within appropriate transmit bands and receive bands, respectively. In this way, the filters act to isolate the transmit band from the receive band which may be closely space in respect of frequency and to isolate the receive band from the closely spaced transmit band.

Figure 1B:
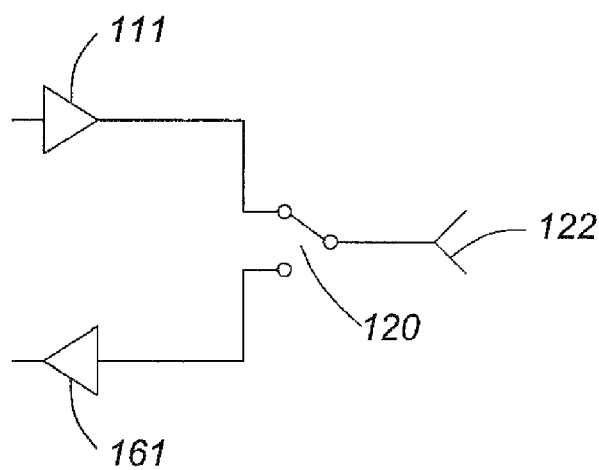
FIG. 1b is a simplified block diagram of a prior art TDD transceiver.

Referring to FIG. 1b, a prior art TDD circuit is shown. The antenna 122 is coupled to switch 120. The antenna 122 is switchably coupled to power amplifier 111 forming the transmit portion of the TDD circuit. The antenna 122 is also switchably coupled to low noise amplifier 161 forming a receive portion of the TDD circuit. The switch is alternately switched between the power amplifier 111 in transmit mode and the low noise amplifier in receive mode to achieve TDD operation.

Figure 2:
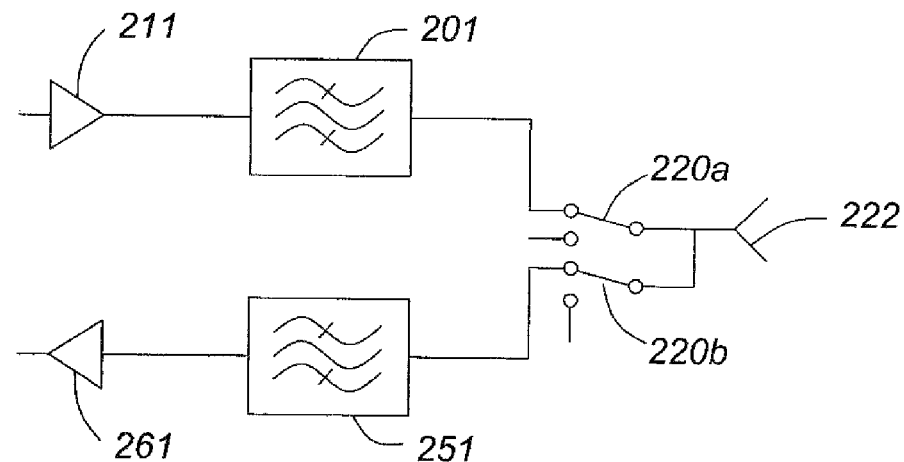
FIG. 2 is a simplified block diagram of a prior art dual mode FDD/TDD transceiver.

Referring to FIG. 2, a prior art dual FDD/TDD transceiver circuit is shown. Antenna 222 is coupled to each of two switches 220a and 220b. The switches are coupled to filters 201 and 251, respectively. The filter 201 is then coupled to power amplifier 211 forming the transmit portion of the FDD circuit when switched as shown. The filter 251 is coupled to low noise amplifier 261 forming a receive portion of the FDD circuit when switched as shown. The filters 201 and 251 are designed for passing signals within appropriate transmit bands and receive bands, respectively. In this way, the filters act to isolate the transmit band from the closely spaced receive band and to isolate the receive band from the closely spaced transmit band. For TDD operation, one switch 220a and 220b is alternately coupled to the transmit path and receive path, respectively, while the other switch 220b and 220a is alternately decoupled from the transmit path and the receive path, respectively.

Figure 3:
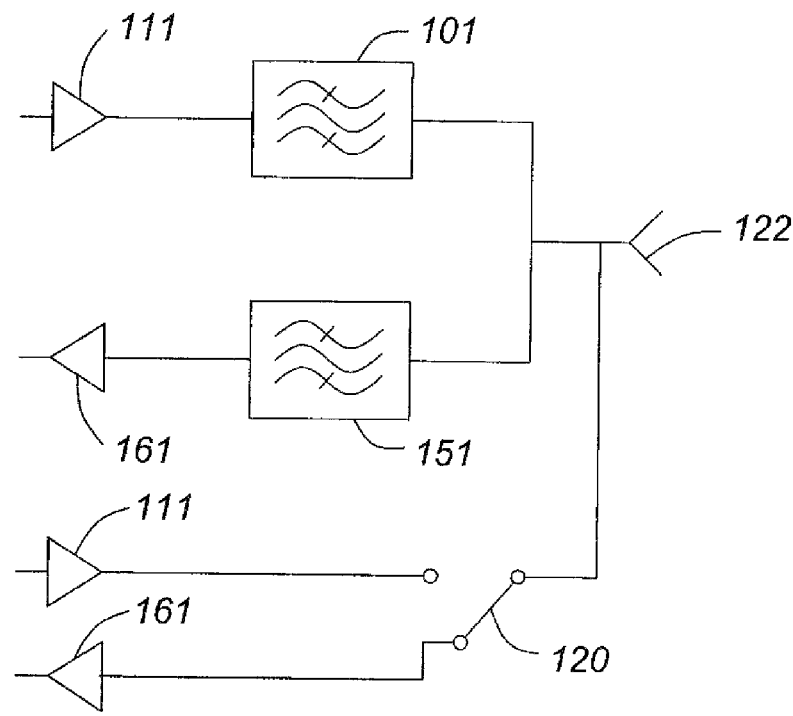
FIG. 3 is a simplified block diagram of another prior art dual mode FDD/TDD transceiver.

Of course, one way to allowing both FDD and TDD radios to operate would be to provide separate radios and RF front ends for both systems. Referring to FIG. 3, a simple solution to the dual FDD/TDD transceiver problem is shown wherein two radios are disposed within a same device, one for TDD and one for FDD. Here the radio of FIG. 1a is coupled to the radio of FIG. 1b each sharing the same antenna 122. One circuit or the other is powered depending on a mode of operation. Advantageously, there are very small losses incurred in each radio transmit and receive path. Unfortunately, such a circuit uses considerable additional resources (two extra amplifiers, etc.) to achieve the dual mode operation. This does not allow for efficient re-use of blocks, so will increase cost and size.

It would be advantageous to allow for a single power amplifier (PA) and low noise amplifier (LNA) to be used in a system that operates in both time-division-duplex (TDD) and frequency division duplex (FDD) modes without having to incur additional filter losses for TDD operation.

Figure 4:
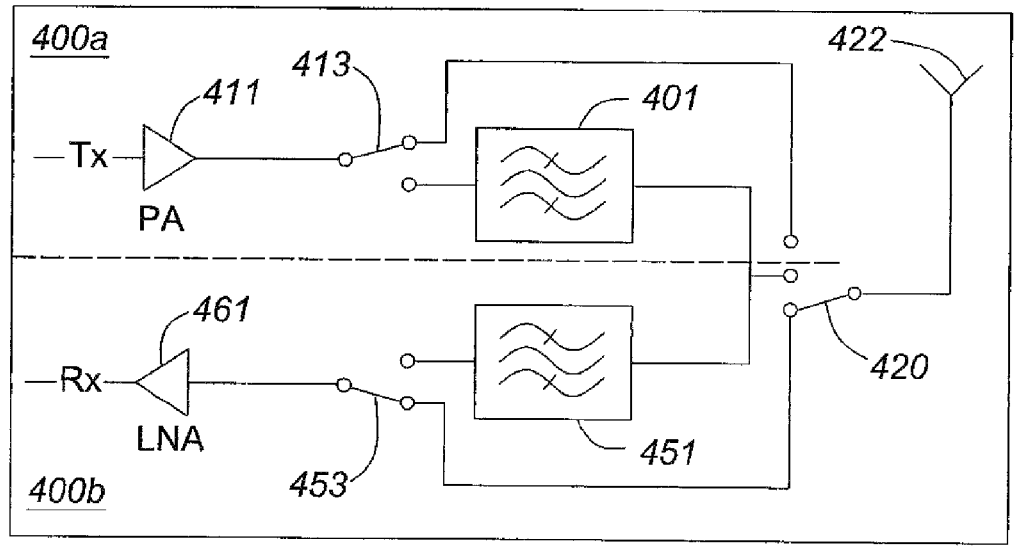
FIG. 4 is a simplified block diagram of a dual mode FDD/TDD transceiver according to an embodiment of the invention.

Referring to FIG. 4, a simplified schematic diagram of a dual FDD/TDD transceiver circuit is shown that incorporates duplexer filters 401 and 451 for FDD operation. In FDD operation, both a transmitter 400a and receiver 400b are available for use simultaneously but at different frequencies. A power amplifier 411 is disposed in the transmitter 400a. Switch 413 switches a signal for transmission via a first transmit coupling path to the filter 401 in a first mode of operation and bypassing the filter 401 via a second transmit coupling path in a second other mode of operation. A second switch 420 couples the transmitter to antenna 422 either via the filter 401 within the first transmit coupling path or bypassing same via the second transmit coupling path. When bypassed, the switch 420 also acts to switch between transmit and receive modes for TDD operation.

A low noise amplifier 461 is disposed within the receiver 400b. Switch 453 switches a signal received via the filter 451 disposed within a first receive coupling path in a first mode of operation and bypassing the filter 451 via a second receive coupling path in a second other mode of operation. The second switch 420 couples the receiver to antenna 422 either via the filter 451 within the first receive coupling path or bypassing same via the second receive coupling path. When bypassed, the switch 420 also acts to switch between transmit and receive modes for TDD operation.

The power amplifier 411 and LNA 461 are sufficiently broadband to cover both the TDD and FDD bands and to provide operation for each band within specifications. For example, a WiMAX radio might transmit in TDD mode from 2.5-2.7 GHz and an FDD radio may transmit at 1.7 GHz, and receive at 2.1 GHz. In this example, the PA operates at 1.7 and 2.5-2.7 GHz, while the LNA operates at 2.1 and 2.5-2.7 GHz. As is evident to those of skill in the art, the operation in each range is preferably within specifications and the specifications for the FDD radio and for the TDD radio need not be the same or similar. Thus, although the transmitter PA is designated to operate at 1.7 and over the 2.5-2.7 GHz band, the performance at 1.7 GHz and at 2.5-2.7 GHz need not be same.

When operating in TDD mode, the filters 401 and 451 are bypassed by the switches 420, 413 and 453, and the switches 420, 413 and 453 are configured as shown in FIG. 4 for the receive timeslot. The switch 420 between the filters 401 and 451 and the antenna 422 alternates for selecting the transmit or receive mode. When operating in FDD mode, the switches 413 and 453 are set differently than shown in FIG. 4 to couple the filters 401 and 451 to the power amplifier 411 and low noise amplifier 451, respectively. Simultaneously, the switch 420 is set to the middle position shown for coupling the antenna 422 to both filters 401 and 451. Thus, a single PA 411 and LNA 461 is used to enable both TDD and FDD operation without losses in TDD mode associated with the filters.

Though the switch 420 is shown as a single switch, alternatively, it comprises a plurality of switches. The signal losses through the additional switches are small relative to the signal losses realized when passing through the filters. Thus, the solution is relatively efficient with significant savings in circuitry over a dual radio solution.

Figure 5:
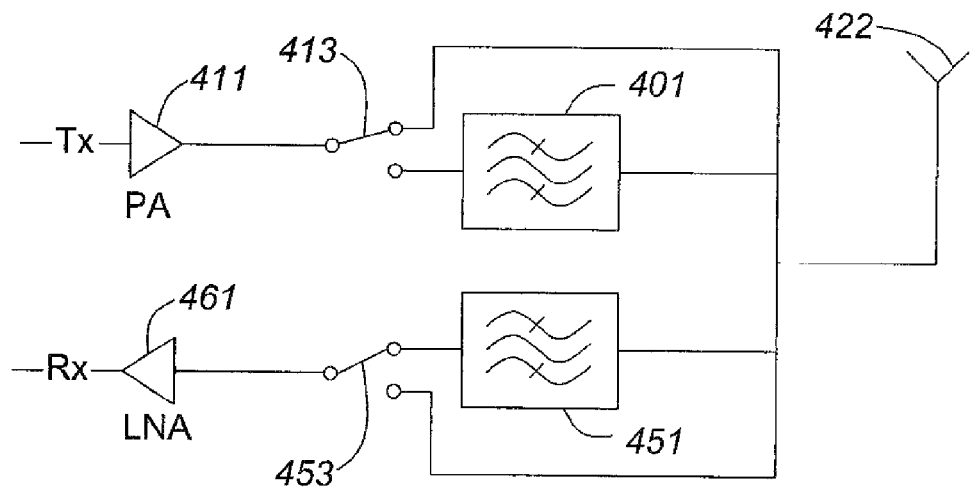
FIG. 5 is a simplified block diagram of a dual mode FDD/TDD transceiver according to an embodiment of the invention.

Another embodiment is shown in FIG. 5. The elements of the circuit of FIG. 5 are labeled identically to those of FIG. 4 and serve analogous functions. Distinguished from the configuration of FIG. 4, here the switch 420 is absent leaving a first transmit coupling path comprising filter 401 and a first receive coupling path comprising filter 451 fixedly coupled to the antenna 422. The circuit is shown in TDD transmit (Tx) mode. TDD receive (Rx) mode occurs when both switches 413 and 453 are switched to the other polarity. FDD mode occurs when both switches 413 and 453 are switched to couple the PA 411 to the first transmit coupling path comprising the filter 401 and the LNA 461 to the first receive coupling path comprising filter 451. In this architecture, the filters 401 and 451 are not completely removed from the circuit when in TDD mode, and the TDD feed line is not completely isolated from the circuit when in FDD mode. Proper phasing of each feed line, and management of the impedances is optionally considered during design and implementation in order to ensure that the stubs that are presented to the antenna do not impair performance.

The advantage of this alternative is that the switch loss of the circuit of FIG. 4 occurring between the filters and the antenna is eliminated, and there are no additional losses in either TDD or FDD modes compared to a TDD only or FDD only radio.

Figure 6:
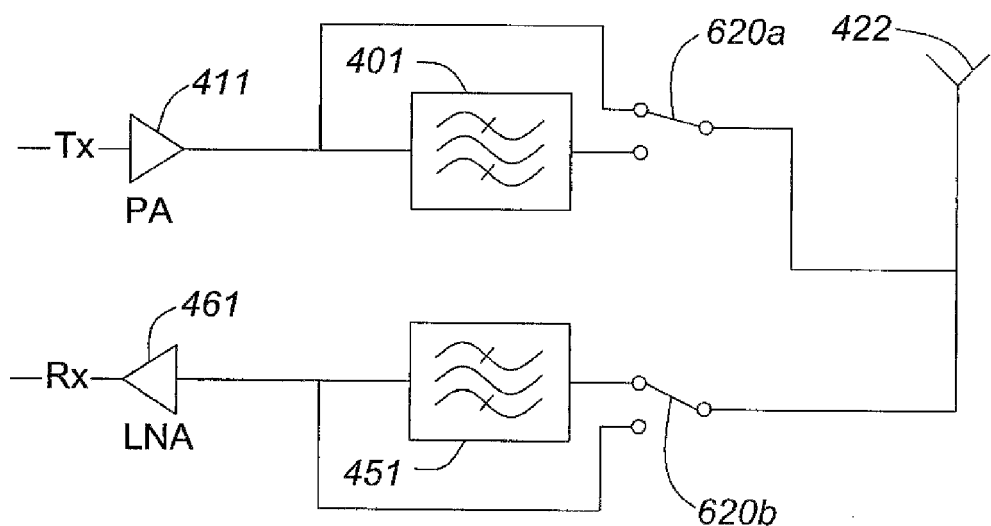
FIG. 6 is a simplified block diagram of a dual mode FDD/TDD transceiver according to an embodiment of the invention.

A third embodiment is shown in FIG. 6. The elements of the circuit of FIG. 6 are labeled identically to those of FIG. 4 and serve analogous functions. Distinguished from the configuration of FIG. 4, here the switches 413 and 453 are absent leaving the first transmit coupling path comprising filter 401 fixedly coupled to the PA 411 and the first receive coupling path comprising filter 451 coupled to LNA 453. The switch 422 is replaced with two switches 620a and 620b for coupling the antenna to either the first receive coupling path or the second receive coupling path and to either of the first transmit coupling path or the second transmit coupling path. This supports FDD mode when both are coupled to the first receive coupling path and the to the first transmit coupling path, respectively. This supports TDD mode when the second receive coupling path and the second transmit coupling path are coupled, alternately. The circuit is shown in TDD Tx mode. TDD Rx mode will have both switches in the opposite position. FDD mode has both switches for coupling the antenna to the filters 401 and 451.

Figure 7:
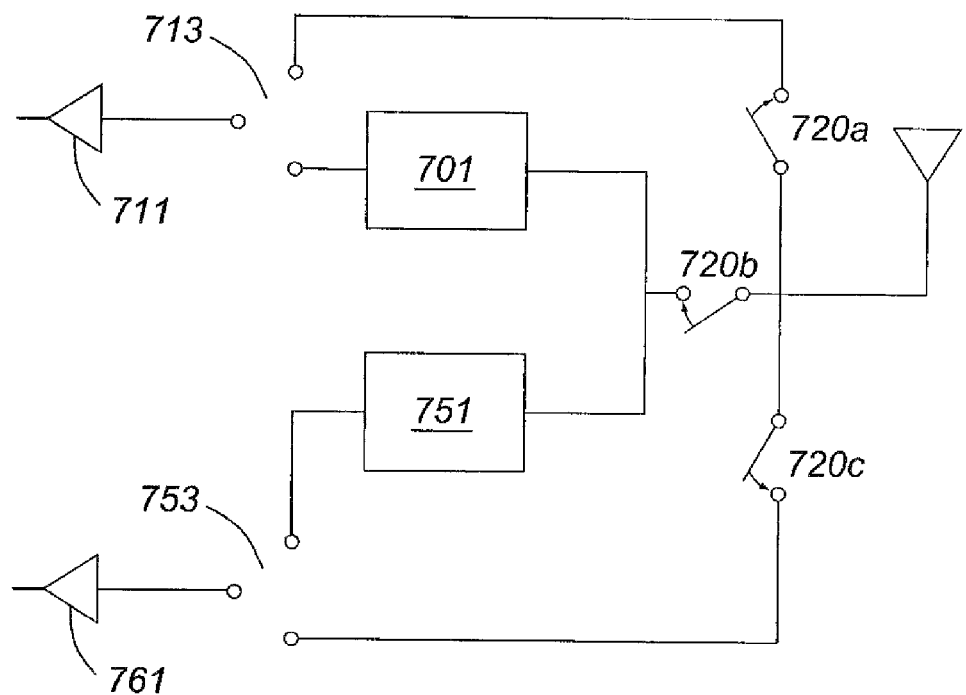
FIG. 7 is a simplified block diagram of a dual mode FDD/TDD transceiver according to an embodiment of the invention.

Referring to FIG. 7, shown is a configuration similar to FIG. 4, wherein the switch 420 is shown as three separate switches. Same numerals designate same elements. As is shown, only the switch 420 is absent from the design and replaced by three switches 720a, 720b, and 720c. Closing switch 720b while opening switches 720a and 720c results in FDD mode of operation. Opening switch 720b while alternately closing switches 720a and 720c results in TDD mode of operation. Switches 413 and 453 operate analogously to how they operated for FIG. 4. Alternatively, switches 413 and 453 are omitted.

This technique allows for a single RF front end to support both FDD and TDD operation with minimal complexity and loss. Though the above noted embodiments describe TDD and FDD implementations, it is also applicable to other implementations wherein bypassing the input filter is advantageous for a dual use front end. For example, when receiving GPS and LTE on a same antenna, it may improve performance to periodically avoid an input filter when receiving the GPS signal so as not to degrade signal strength due to losses in the filter. Alternatively, the input filter is always bypassed when receiving GPS signals. Further alternatively, a different filter is used supporting a less degraded signal strength for the GPS signal.

The embodiments described hereinabove provide for a single PA to operate as a signal amplifier for the WiMAX signals during a first time interval and, during a different interval of time, as an amplifier for an LTE signal. The embodiments described hereinabove provide for a single LNA to operate as the signal amplifier for WiMAX signals during a first interval and, during a different interval of time, as an amplifier for an LTE signal. Alternatively, the embodiments described hereinabove provide for a configurable front end supporting either an FDD or a TDD communication standard. When dynamic switching between FDD and TDD is not used, there remains a benefit of a single part serving functions in different solutions thereby increasing part volume and decreasing a number of different parts in inventory for systems manufacturers. The limited losses and very small increased die utilization makes the example circuits useful for either dual use applications or as a single use component capable of supporting dual functions.

Numerous other embodiments may be envisaged without departing from the spirit or scope of the invention.

What is claimed is:

1. A transceiver circuit comprising a switching circuit configured to operate in a first mode of operation and a second mode of operation such that a receive signal propagates from an antenna through a first filter to a low noise amplifier while simultaneously a transmit signal propagates from a power amplifier through a second filter to the antenna when operating in the first mode, and the receive signal propagates from the antenna to the low noise amplifier without being filtered while alternating with the transmit signal propagating from the power amplifier to the antenna without being filtered when operating in the second mode.

2. The transceiver circuit of claim 1 wherein the first and second filters are duplexer filters.

3. The transceiver circuit of claim 1 wherein the first mode of operation is a frequency division duplex (FDD) mode and the second mode of operation is a time division duplex mode.

4. The transceiver circuit of claim 1 wherein the switching circuit dynamically switches between the first mode of operation and the second mode of operation.

5. The transceiver circuit of claim 1 wherein the first amplifier is a low noise amplifier and the second amplifier is a power amplifier.

6. The transceiver circuit of claim 1 wherein the receive signal and the transmit signal are radio frequency signals.

7. The transceiver circuit of claim 1 wherein the switching circuit is further configured to switch between a receive mode and a transmit mode when operating in the second mode.

8. A method of operating a transceiver circuit, the method comprising switching between a first mode of operation and a second mode of operation such that that a receive signal propagates from an antenna through a first filter to a low noise amplifier while simultaneously a transmit signal propagates from a power amplifier through a second filter to the antenna when operating in the first mode, and the receive signal propagates from the antenna to the low noise amplifier without being filtered while alternating with the transmit signal propagating from the power amplifier to the antenna without being filtered when operating in the second mode.

9. The method of claim 8 wherein the first mode of operation is a frequency division duplex (FDD) mode and the second mode of operation is a time division duplex mode.

10. The method of claim 8 wherein the switching circuit dynamically switches between the first mode of operation and the second mode of operation.

11. The method of claim 8 wherein the first amplifier is a low noise amplifier and the second amplifier is a power amplifier.

12. The method of claim 8 wherein the receive signal and the transmit signal are radio frequency signals.

13. The method of claim 8 further comprising switching between a receive mode and a transmit mode when operating in the second mode.

14. A radio comprising:
   a switching circuit configured to operate in a first mode of operation and a second mode of operation such that a receive signal propagates from an antenna through a first filter to a first amplifier while simultaneously a transmit signal propagates from a second amplifier through a second filter to the antenna when operating in the first mode, and the receive signal propagates from the antenna to the first amplifier without being filtered while alternating with the transmit signal propagating from the second amplifier to the antenna without being filtered when operating in the second mode;
   an antenna coupled through the switching circuit to the first amplifier, the second amplifier, the first filter and the second filter, and configured to receive and transmit radio frequency signals; and
   a configurable front end module coupled to the first amplifier and the second amplifier, and configured to receive an amplified receive signal from the first amplifier and provide a transmit signal to be amplified to the second amplifier.

15. The radio of claim 14 wherein the first and second filters are duplexer filters.

16. The radio of claim 14 wherein the first mode of operation is a frequency division duplex (FDD) mode and the second mode of operation is a time division duplex mode.

17. The radio of claim 14 wherein the switching circuit dynamically switches between the first mode of operation and the second mode of operation.

18. The radio of claim 14 wherein the first amplifier is a low noise amplifier and the second amplifier is a power amplifier.

19. The radio of claim 14 wherein the receive signal and the transmit signal are radio frequency signals.

20. The radio of claim 14 wherein the switching circuit is further configured to switch between a receive mode and a transmit mode when operating in the second mode.

\* \* \* \* \*

UNITED STATES PATENT AND TRADEMARK OFFICE
CERTIFICATE OF CORRECTION

Page 1 of 1

PATENT NO. : 8,923,169 B2
APPLICATION NO. : 13/790192
DATED : December 30, 2014
INVENTOR(S) : Grant Darcy Poulin It is certified that error appears in the above-identified patent and that said Letters Patent is hereby corrected as shown below:

In the Specification

In column 5 at line 54, Change "the to the" to --to the--.

In the Claims

In column 7 at line 1, In Claim 8, change "that that" to --that--.

Signed and Sealed this
Eighteenth Day of August, 2015

Michelle K. Lee
*Director of the United States Patent and Trademark Office*